United States Patent Office 3,578,562
Patented May 11, 1971

1

3,578,562
METHOD AND APPARATUS FOR CONTINUOUS MONITORING AND CONTROL OF NEUTRON ABSORPTION PROPERTIES OF CHEMICAL SHIM
Loering M. Johnson, Tariffville, and Arthur M. Yuile, Windsor, Conn., assignors to Combustion Engineering, Inc., Windsor, Conn.
Filed Oct. 23, 1968, Ser. No. 769,778
Int. Cl. G21c 17/00, 1/22; G01t 3/00
U.S. Cl. 176—22                                      7 Claims

ABSTRACT OF THE DISCLOSURE

An apparatus, and method of operation thereof, to continuously monitor and control the neutron absorption properties of chemical shim used in regulating reactivity of a pressurized water nuclear reactor. Coolant-moderator fluid, including the soluble neutron absorption property in the chemical shim, is continuously passed through a chamber having plural neutron detectors surrounding a neutron source of known strength. Utilizing the neutron absorptiometry principle, a signal representative of the concentration of the absorption properties of the chemical shim in the coolant-moderator is derived. This signal is then applied through signal conditioning means to a readout and alarm device so that constant monitoring of the shim concentration absorption properties may be accomplished; additionally, the signal may be applied to maintain the concentration of neutron absorption properties of the chemical shim in the coolant-moderator at a desired level.

BACKGROUND OF THE INVENTION

In pressurized water nuclear reactors reactivity control for power level regulation is accomplished by means of mechanical control rods used to determine the geometry of heterogeneous neutron absorbers within the reactor core. In order to supplement the use of the mechanical control rods for purpose of long range reactivity control, such as necessitated by long-time transients, a soluble neutron absorber is introduced into the coolant-moderator. The soluble neutron absorber in a chemical shim in the coolant-moderator permits improved core performance while increasing flexibility of the fuel assembly mechanical design through reduced control rod requirements.

The use of neutron absorption properties of chemical shim for reactivity control in pressurized water reactors contributes substantially to the reduction of the costs of power production. As noted, the soluble neutron absorber in the chemical shim is not used to control rapid changes in power demand, a function of the mechanical control rods, but rather to control overall reactivity which fluctuates due to long-tine transients such as fuel burn-up. Such chemical shim neutron absorber control has advantages over other types of control systems in that it reduces the cost of achieving control by simplification of the mechanical control apparatus, improves power distribution, and increases fuel utilization capabilities.

Chemical shim is provided in the coolant-moderator by the inclusion of a soluble neutron absorber such as boric acid therein. The number of neutrons available for inducing fission must be kept within fine limits in order to sustain the reaction yet preventing it from running away; i.e., the average number of neutrons produced by fission must be substantially equal to the number of neutrons captured to produce fission, captured by the moderator, and leaked from the core. The neutron absorption properties of the chemical shim act as the medium by which the neutrons, by means of physical capture, are removed from the fission cycle, thus maintaining control of the number of neutrons available for fission enabling the reactivity to be kept within the desired narrow limits.

To effectively use chemical shim as a method of reactivity control, it is necessary to know the concentration of its neutron absorption properties as a function of time. This requires a continuous on-line monitoring device which is simple, accurate, reliable and readily adaptable to provide a related control function. Techniques available for measurement of the neutron concentration properties of chemical shim in water include chemical titration, photometric techniques and neutron absorption. Of the three, neutron absorption is the technique most readily meeting all of the desired criteria.

SUMMARY OF THE INVENTION

In order to continuously monitor and regulate neutron absorption properties of chemical shim in pressurized water reactors, we have devised a simple and efficient device based on the principles of neutron absorption for continuously measuring the chemical shim absorption property concentration and regulating such concentration between specified limits. The coolant-moderator fluid including the soluble neutron absorber shim is continuously passed through a chamber. Within the chamber are located plural neutron detectors uniformly arranged about a neutron source of known strength. The absorption properties of the chemical shim present in the coolant-moderator passing through the chamber will absorb a certain specific portion of the neutrons emitted from the source according to the neutron absorber shim concentration within the fluid. The detectors will detect the neutrons emitted from the source less those captured by the absorber shim and generate a signal representative of the number of net emissions therefrom. Using the principles of neutron absorption, the emissions detected from a known neutron source through a particular neutron absorber shim of specific concentration can be calculated and a curve for varying concentrations of the particular absorber shim can be determined. From this curve unknown concentrations of the neutron absorber can then be determined from the number of emissions actually detected (with the same given source).

Therefore, the signal from the detectors representing the net count rate of emission received from the known source is directly related to chemical shim absorption property concentration within the coolant-moderator. Signal conditioning means are provided to amplify and condition the signal representative of the count rate from the detectors to a signal representative of the neutron absorber concentration. This chemical shim neutron absorption property concentration signal is then fed to monitoring and regulating systems whereby an operator has a continuous record of neutron absorption properties of chemical shim in the coolant-moderator and the degree of concentration may be automatically (or manually) regulated.

BRIEF DESCRIPTION OF THE DRAWINGS

FIG. 3 is a detailed schematic diagram of the measurement and signal conditioning portions of the system of this invention.

DESCRIPTION OF THE PREFERRED EMBODIMENT

Figure 1:
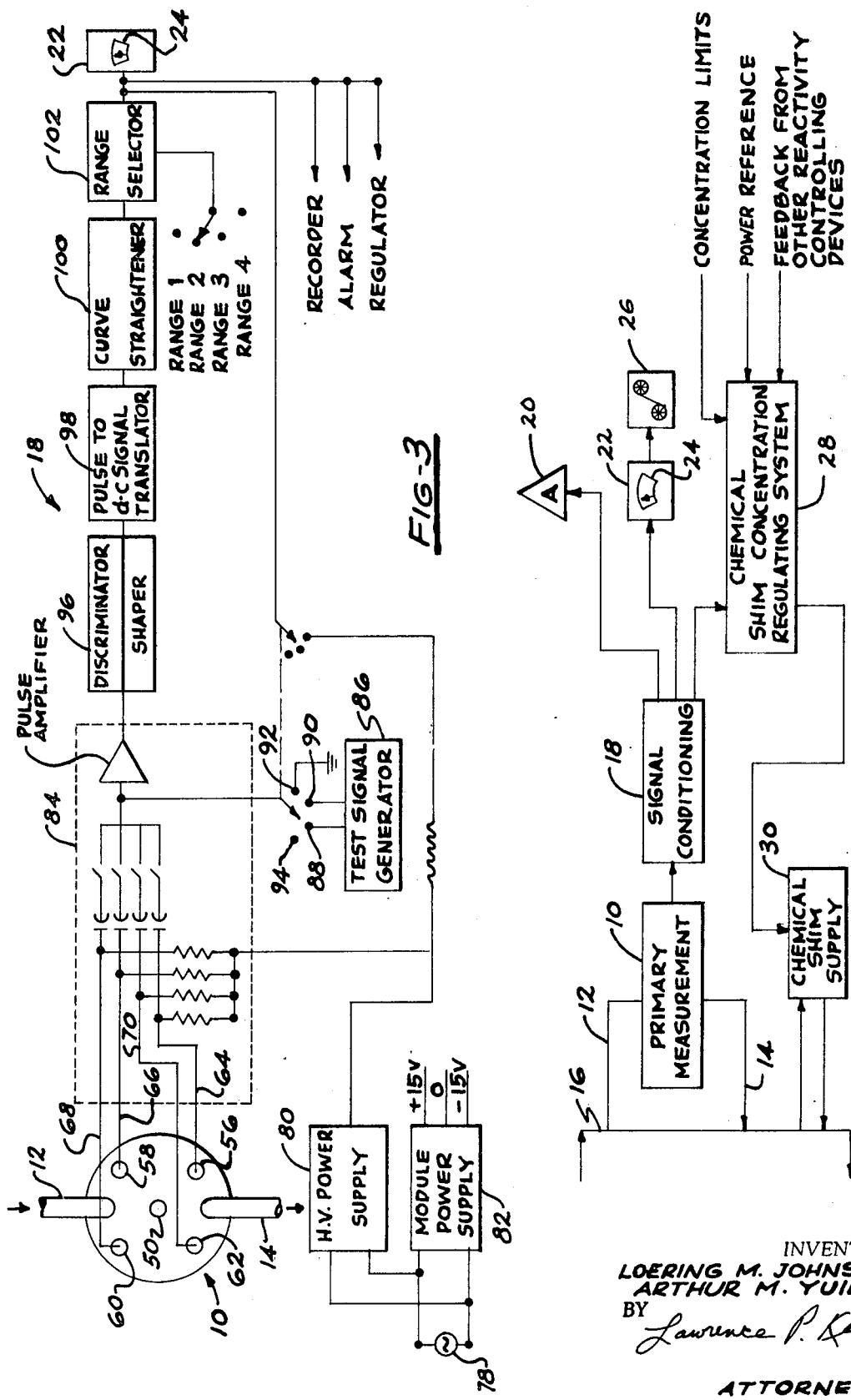
FIG. 1 is a general schematic diagram of the chemical shim absorption property concentration monitoring and regulating system of this invention.

Referring now to the drawings, FIG. 1 is a schematic diagram of the chemical shim neutron property concentration monitoring and regulating system of this invention. We have provided a primary measurement means 10 having an inlet conduit 12 and an outlet conduit 14 connected between the primary coolant-moderator loop 16 and the primary measurement means 10. In a manner to be more fully explained hereinbelow, the primary measurement means 10 develops a primary signal which is relayed to a signal conditioning means 18 where the primary signal is transformed into a signal representative of the chemical shim neutron absorption property concentration within the coolant-moderator. The signal representative of the shim concentration absorption properties is then available for alarm signaling, continuous concentration monitoring, and automatic (or manual) concentration regulation.

An alarm means 20 is provided which incorporates bistable devices set at predetermined high and low limits of the operating band of neutron absorption concentration. At either extreme, the alarm means 20 will alert the operator if the absorption concentration moves out of the desired operating band. Continuous monitoring of the chemical shim absorption property concentration is accomplished by applying the conditioned signal to a meter 22, of multiple range, with a visual scale 24 for allowing the operator to determine the neutron absorber concentration at any given time. A recording device 26 may be provided to yield permanent time-based records to permit neutron absorber concentration trends to be noted.

The conditioned signal is additionally used to regulate the chemical shim absorption property concentration within the coolant-moderator. The conditioned signal is sent to a chemical shim absorption property concentration regulation system 28. The regulation system 28 also receives signals representative of reactivity demand conditioned upon circumstances within the reactor environment, such as allowable concentration limits, power reference from the steam supply system, and feedback from other reactivity controlling devices (e.g., control rods, reflector elements, moderator level). By comparing the information from these signals, a running record of the reactivity demand within the system may be had and optimum reactivity adjustments may be made for various changes in power demand or to compensate for burn-up of chemical shim absorption properties. Adjustment in reactivity is made by using the combined information to vary the concentration of chemical shim absorption properties in the coolant-moderator by effecting the chemical shim supply 30 to add to or remove from the primary coolant-moderator loop 16 a portion of the chemical shim.

Figure 2:
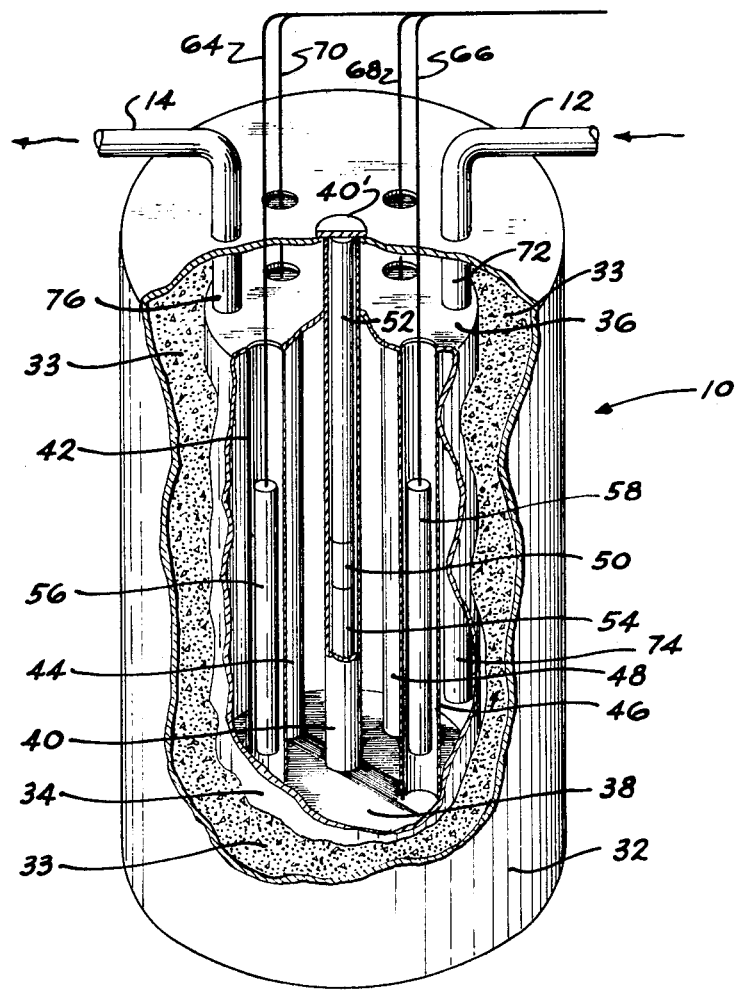
FIG. 2 is a perspective view, partly in section, of the measurement chamber of this invention.

FIG. 2 is a detailed view of the primary measurement means 10. Within a housing 32 filled with radiation shielding material 33, such as concrete or paraffin, is located a metal cylinder 34 having its ends sealed by plates 36, 38. Extending between the end plates 36, 38 and fixed thereto as by welding are tubes 40, 42, 44, 46 and 48. The central tube 40 extends through the upper end plate 36 and through the top of housing 32 where it is sealed by a removable cap 40'. A neutron source 50 is located within the central tube 40, the source 50 being supported by spacer means 52, 54 formed of a plastic type material such as Bakelite.

Tubes 42, 44, 46 and 48 are geometrically located equidistant from the central source containing tube 40. Within these tubes are located neutron detectors 56, 58, 60, 62 of any well-known type, each detector having an outside diameter of at least one inch (this dimension has proven critical in obtaining a workable signal for the degree of accuracy required when using a source of a strength of one Curie). Cables 64, 66, 68 and 70 extend from respective detectors 56, 58, 60 and 62 through the housing 32 where they pass to signal conditioning means, to be explained hereinbelow. The cables 64, 66, 68 and 70 are preferably coaxial cables so that extraneous signals will not interfere with the signals from the detectors.

In order to pass the coolant-moderator to the primary measurement means 10, conduit means intersecting the primary coolant-moderator loop 16 are in fluid communication with metal cylinder 34. An inlet conduit 12 and an outlet conduit 14 pass through the housing 32. The inlet conduit 12 has a portion 72 which passes through the upper end plate 36 of the cylinder 34 and terminates at portion 74 some distance above the lower end plate 38. The outlet conduit 14 connects at portion 76 with the upper end plate 36 and is in fluid communication with the interior of the metal cylinder 34. With this arrangement the outlet conduit portion 76 draws liquid from the top of the cylinder 34 while the inlet conduit portion 74 admits liquid at the bottom of the cylinder 34. This assures that there will be liquid in the cylinder 34 at all times (for an added radiation shielding factor) and that there will be adequate fluid mixing throughout the interior thereof. A drain plug (not shown) may be provided in the bottom of the cylinder 34 to permit the cylinder to be drained when desired.

The cables 64, 66, 68 and 70 lead to signal conditioning means 18 shown in FIG. 3. Power for the signal conditioning means 18 is supplied from a standard alternating signal supply 78 to a high voltage power supply 80 and a module power supply 82. The high voltage power supply 80 powers the remote preamplifier 84 while the module power supply 82 powers the additional components of the signal conditioning means 18. A test signal generator 86 is provided to enable an outside known signal to be imposed on the signal conditioning means 18 in order to determine the reliability of the readout signal from the means 18. The test signal generator 86 has positions 88, 90 (for two different known checking rates) and a high voltage check 92, as well as an "off" position 94. The signal conditioning means 18 additionally contains a discriminator-shaper 96, a pulse-to-DC signal translator 98, a curve straightener 100, and a multiple stage range selector 102 (four range stages shown) for the purpose to be explained hereinbelow.

The operation of the apparatus of this invention is as follows. A continuous sample of coolant-moderator is withdrawn from the primary coolant-moderator loop 16 of a pressurized water nuclear reactor by means of conduit 12. The coolant-moderator is passed through the metal cylinder 34 of the primary measurement means 10, being withdrawn therefrom through conduit 14, thus providing a continuous flow of fluid through the primary measurement means 10. A known neutron source 50, such as a standard one Curie plutonium beryllium source, centrally located within the tube 40 of the metal cylinder 34, emits neutrons which, if not captured by the neutron absorption properties of the chemical shim in the coolant-moderator are detected by four one-inch detectors 56, 58, 60 and 62 geometrically located equidistant from the source 50. The detectors in turn emit electrical signals via cables 64, 66, 68 and 70 to the signal conditioning means 18, these signals being representative of the count rate of neutrons reaching each respective detector.

The coolant-moderator passing through the primary measurement means 10, as noted above, contains a chemical shim (e.g., boron in the form of boric acid) which serves as a soluble neutron absorber to capture neutrons within the reactor in order to control reactivity. The count rate signal from the detectors 56, 58, 60 and 62 are thus effected by the absorption of neutrons by the absorption properties of the chemical shim within the coolant-moderator. According to well-known neutron absorptiometry principles, the rate at which a given concentration of the absorption properties of a particular chemical shim will absorb neutrons from a source of known strength can be calculated. In this manner a profile of absorption over a range of concentrations for a particular chemical shim and a particular source can be obtained. Therefore, with an equivalent source of neutrons yielding a known neutron flux, a proportional chemical shim neutron absorption property concentration signal can be determined from the count rate received by the detectors by referring this count rate to the absorption profile. In the instant invention the signal conditioning means 18 develops the proportional chemical shim absorption property concentration signal from the count rate signal received from the detectors 56, 58, 60 and 62.

The signal conditioning means 18 develops the proportional absorber concentration signal in the following manner. Cables 64, 66, 68 and 70 pass the neutron count rate signal to the remote preamplifier 84 where the signals are combined and amplified. The resultant signal passes through the discriminator-shaper 96, the pulse-to-DC signal translator 98, the curve straightener 100 and the multiple stage range selector 102, wherein it is transformed into a proportional absorption property concentration signal which can be used for monitoring and control. The selection and design of the particular components of the signal conditioning means 18 used is dependent upon the absorption profile of the particular chemical shim employed for reactivity control.

Since the coolant-moderator is being continuously passed through the primary measurement means 10, the proportional absorption property concentration signal emitted from the signal conditioning means 18 represents a varying indication of the concentration of the neutron absorption properties of the chemical shim present in the coolant-moderator at any particular time. Thus, from this signal a continuous monitoring and control of the absorber concentration can be obtained. The signal is fed to the meter 22 having a visual scale 24 to permit continuous operator monitoring of the concentration level. Recording means 26 and alarm means 20 are used in conjunction with the continuous monitoring function to provide permanent time-based records of absorber concentration trends and automatic warning in case the degree of concentration goes beyond specified operating limits. Automatic control of the chemical shim absorption property concentration is readily accomplished by feeding the proportional absorption property concentration signal into the concentration regulating system 28 where it is compared with other reactivity parameters to trigger the chemical shim supply 30 to add or subtract the chemical shim from the primary coolant-moderator loop 16. Manual control may be accomplished by providing for direct control of the chemical shim supply 30 by the system operator.

From the foregoing, it can be seen that we have developed a simple and efficient method and apparatus for continuously monitoring and controlling the concentration of the neutron absorption properties of a chemical shim used to effect reactivity in pressurized water nuclear reactors. Utilizing the principles of neutron absorptiometry, a continuous signal proportional to chemical shim absorption property concentration is developed from a flowing sample of coolant-moderator passed between a known neutron source and a series of particularly geometrically arranged neutron detectors. This continuous proportional signal is used to give visual and recorded indications of the absorber concentration at any particular time. Additionally, the signal may be used to activate a warning alarm or control a concentration regulating system when the neutron absorbing property concentration varies from desired operating conditions.

While we have illustrated and described a preferred embodiment of our invention, it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

1. An apparatus for continuous on-line determination of chemical shim neutron absorption property concentration comprising: a cylinder having upper and lower end plates affixed thereto; an inlet conduit and an outlet conduit in fluid communication between the interior of said cylinder and a primary fluid loop in which the chemical shim is present; a neutron source of known strength centrally located within said cylinder; plural neutron detection devices geometrically spaced equidistant from said neutron source, said detectors having an outside diameter of at least 1 inch; signal conditioning means including a preamplifier and components dependent for their construction upon the absorption profile of the particular chemical shim whose absorption property concentration it is desired to determine; cable means connected between said neutron detection devices and said signal conditioning means for transmitting a signal representative of neutron count rate received by said detection devices to said signal conditioning means; said signal conditioning means conditioning said neutron count rate signal to a signal; proportionally representative of chemical shim absorption property concentration; and output means responsive to said signal from said signal conditioning means.

2. The apparatus of claim 1 wherein the inlet conduit extends through said upper end plate into said cylinder interior and terminates some distance above said lower end plate to feed chemical shim-containing fluid to said cylinder near the bottom thereof, and said outlet conduit is fixed to an opening in said upper end plate so as to withdraw said fluid from the top of said cylinder so as to provide an adequate mixing of the fluid throughout the cylinder.

3. The apparatus of claim 1 wherein the output means includes a readout device giving a continuous visual indication of chemical shim absorption property concentration, a recording device formulating a time based record of chemical shim absorption property concentration trends, and an alarm means activated when the proportional chemical shim absorption property concentration signal fails to fall within certain specified limits.

4. The apparatus of claim 3 wherein the output means further includes a control means for regulating chemical shim absorption property concentration within the primary fluid loop.

5. The apparatus of claim 4 wherein the control means includes receiver and comparator means which receives and compares said proportional chemical shim absorption property concentration signal and an environmental conditioned demand signal to determine required neutron absorption property concentration and the deviation therefrom, and chemical shim supply means in regulatable fluid communication with said primary fluid loop, said supply means being regulated to adjust chemical shim absorption property concentration in response to the determined deviation from the concentration required.

6. The method for continuous determination of neutron absorption property concentration of chemical shim comprising the steps of:
   (a) continuously passing fluid containing the chemical shim through a primary measurement means;
   (b) providing said primary measurement means with a neutron source of known strength;
   (c) detecting the neutrons within the said primary measurement means emitted by said neutron source which pass through said chemical shim neutron absorption property containing fluid;
   (d) generating a signal representative of the count rate of the neutrons as detected;
   (e) conditioning said signal representative of said count rate so as to develop a signal proportionally representative of chemical shim absorption property concentration;

(f) utilizing said concentration signal to readout a continuous visual indication of chemical shim absorption property concentration;
(g) recording said concentration readout on a time based record; and
(h) activating an alarm means when the proportional chemical shim absorption property concentration signal indicates that said concentration fails to fall within the specified limits.

7. The method of claim 6 wherein the concentration signal is additionally used to regulate chemical shim absorption property concentration.

References Cited

UNITED STATES PATENTS

| | | | |
|---|---|---|---|
| 2,567,057 | 9/1951 | Crumrine | 250—83.1X |
| 3,009,062 | 11/1961 | Brooksbank, Jr., et al. | 250—83.1 |
| 3,378,450 | 4/1968 | Gramer et al. | 176—22X |

CARL D. QUARFORTH, Primary Examiner

H. E. BEHREND, Assistant Examiner

U.S. Cl. X.R.

176—19, 86; 250—83.1